(12) United States Patent
Robertson (10) Patent No.: US 8,638,066 B2
(45) Date of Patent: Jan. 28, 2014

(54) BATTERY OPTIMIZATION AND PROTECTION IN A LOW POWER ENERGY ENVIRONMENT

(75) Inventor: Dale G. Robertson, Lowell, MA (US)

(73) Assignee: BBN Technologies Corp., Cambridge, MA (US)

( * ) Notice: Subject to any disclaimer, the term of this patent is extended or adjusted under 35 U.S.C. 154(b) by 439 days.

(21) Appl. No.: 12/974,895

(22) Filed: Dec. 21, 2010

(65) Prior Publication Data
US 2012/0032682 A1 Feb. 9, 2012

Related U.S. Application Data

(60) Provisional application No. 61/371,871, filed on Aug. 9, 2010.

(51) Int. Cl.
*H02J 7/00* (2006.01)
*H02J 7/04* (2006.01)
*H02J 7/06* (2006.01)

(52) U.S. Cl.
USPC .......... 320/132; 320/152; 320/157; 320/159; 320/162

(58) Field of Classification Search
CPC ....................................................... Y02E 60/12
USPC ......................................................... 320/132
See application file for complete search history.

(56) References Cited

U.S. PATENT DOCUMENTS

| 5,164,652 | A |   | 11/1992 | Johnson et al. |
| 5,539,610 | A |   | 7/1996 | Williams et al. |
| 5,825,485 | A | * | 10/1998 | Cohn et al. ..................... 356/316 |
| 5,931,245 | A | * | 8/1999 | Uetake et al. ................ 180/65.8 |
| 6,873,133 | B1 |   | 3/2005 | Kavounas |
| 2004/0232878 | A1 | * | 11/2004 | Couch et al. .................. 320/101 |
| 2005/0105226 | A1 |   | 5/2005 | Bedard et al. |
| 2005/0225914 | A1 | * | 10/2005 | King .............................. 361/62 |
| 2007/0271044 | A1 | * | 11/2007 | Gutierrez et al. .............. 702/45 |
| 2008/0222439 | A1 | * | 9/2008 | Lin et al. ....................... 713/340 |
| 2008/0285193 | A1 | * | 11/2008 | Watanabe et al. .............. 361/88 |

OTHER PUBLICATIONS

International Search Report mailed Dec. 13, 2011 in corresponding International Application No. PCT/US11/46438.

* cited by examiner

*Primary Examiner* — Edward Tso
*Assistant Examiner* — Ahmed Omar
(74) *Attorney, Agent, or Firm* — Chapin IP Law, LLC (57) ABSTRACT

A method and apparatus for providing battery optimization and protection in a low power energy environment is presented. A current configuration of a battery module including a plurality of a particular type of battery is determined. A voltage level of the battery module is detected. A determination is made whether the current configuration of the battery module is a preferred configuration for the particular type of batteries of the battery module. When the determination is that the current configuration of the battery module is not the preferred configuration for the particular type of batteries of the battery module, then the battery module is reconfigured to a preferred configuration for the particular type of batteries of the battery module.

20 Claims, 6 Drawing Sheets

BATTERY OPTIMIZATION AND PROTECTION IN A LOW POWER ENERGY ENVIRONMENT

CROSS REFERENCE TO RELATED APPLICATIONS

The present application claims the benefit of U.S. Provisional Patent Application No. 61/371,871, filed on Aug. 9, 2010, which is incorporated herein by reference in its entirety.

BACKGROUND

Networks have become ubiquitous. One type of network is known as a wireless ad hoc network. A wireless ad hoc network is a decentralized wireless network. The network is ad hoc because it does not rely on a preexisting infrastructure, such as routers in wired networks or access points in managed (infrastructure) wireless networks. Instead, each node participates in routing by forwarding data for other nodes, and so the determination of which nodes forward data is made dynamically based on the network connectivity. The decentralized nature of wireless ad hoc networks makes them suitable for a variety of applications where central nodes can't be relied on, and may improve the scalability of wireless ad hoc networks compared to wireless managed networks. Minimal configuration and quick deployment make ad hoc networks suitable for emergency situations like natural disasters or military conflicts.

An ad-hoc network is made up of multiple nodes connected by links. Links are influenced by the node's resources (e.g. available energy supply, transmitter power, computing power and memory) and by behavioral properties (e.g., reliability and trustworthiness), as well as by link properties (e.g. line-of-sight interference, length-of-link and signal loss, interference and noise). Since new and old links can be connected or disconnected at any time, a functioning network must be able to cope with this dynamic restructuring, preferably in a way that is timely, efficient, reliable, robust and scalable.

The network must allow any two nodes to communicate, often via other nodes that relay the information. A path is a series of links that connects two nodes. Often there are multiple paths between any two nodes. Many of these applications utilize battery-powered nodes whose uninterrupted service life is limited by the energy efficiency of the node itself. As battery technology is not expected to make significant gains in the near future, there has been a wealth of research into software and hardware methods for reducing total energy consumption for multihop wireless networks.

RADAR (radio detection and ranging) is an object detection system that uses electromagnetic waves to identify the range, altitude, direction, or speed of both moving and fixed objects such as aircraft, ships, motor vehicles, weather formations, terrain and people. A radar system has a transmitter that emits radio waves. When they come into contact with an object they are scattered in all directions. The signal is thus partly reflected back and it has a slight change of wavelength (and thus frequency) if the target is moving. The receiver is usually, but not always, in the same location as the transmitter. Although the signal returned is usually very weak, the signal can be amplified through use of electronic techniques in the receiver and in the antenna configuration. This enables a radar unit to detect objects at ranges where other emissions from the target object, such as sound or visible light, would be too weak to detect. Radar uses include meteorological detection of precipitation, measuring ocean surface waves, air traffic control, police detection of speeding traffic, and military applications.

SUMMARY

Conventional mechanisms such as those explained above suffer from a variety of deficiencies. Wireless network nodes are often limited by transmitter power (transmission range) and available energy resources. Transmitter power often consumes the most energy in the node. Similarly, radar systems can also be limited by power and available energy resources.

Embodiments of the invention significantly overcome power deficiencies associated with other radar devices, and provide mechanisms and techniques that provide battery optimization and protection in a low power energy environment.

In a particular embodiment, power circuitry of the device is used to determine a current configuration of a battery module including a plurality of a particular type of battery. The power circuitry also detects a voltage level of the battery module. The power circuitry further determines whether the current configuration of the battery module is a preferred configuration for the particular type of batteries of the battery module. When the determination is that the current configuration of the battery module is not the preferred configuration for the particular type of batteries of the battery module, then the battery module is reconfigured to a preferred configuration for the particular type of batteries of the battery module. The battery configuration takes place upon insertion of the batteries into the system, prior to powering on the system.

In a particular embodiment of a method for providing battery optimization and protection in a low power energy environment, the method includes determining a current configuration of a battery module including a plurality of a particular type of battery and detecting a voltage level of the battery module. The method further includes determining whether the current configuration of the battery module is a preferred configuration for the particular type of batteries of the battery module. When the determination is that the current configuration of the battery module is not the preferred configuration for the particular type of batteries of the battery module, then reconfiguring the battery module to a preferred configuration for the particular type of batteries of the battery module.

The features of the invention, as explained herein, may be employed in devices and/or software systems for such devices such as those manufactured by BBN of Cambridge, Mass.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
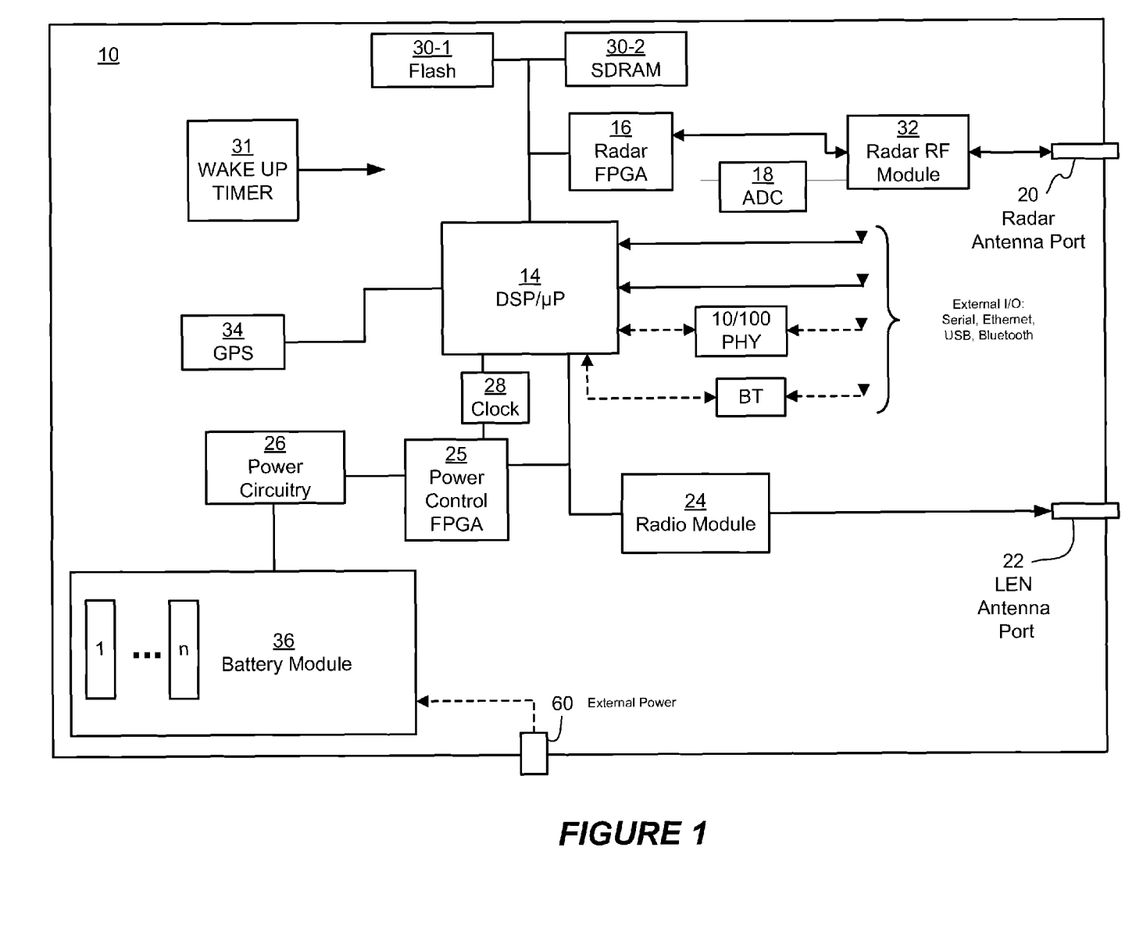
FIG. 1 illustrates an example system architecture for a low energy ad hoc network node and radar unit that provides battery optimization and protection in a low power energy environment in accordance with embodiments of the invention.

FIG. 1 depicts a block diagram of a radar device 10, which can be embodied as a low-energy ad hoc network node, radar sensor unit, or relay node that performs status indication according to embodiments as disclosed herein. The radar device 10 includes power circuitry 26, which is used to provide, sequence, and control power to various other components of the system in combination with Power Control FPGA 25. The power circuitry 26 can be armed and disarmed with respect to a position of an external power switch 62. A power source 36 can include one or more batteries. In FIG. 1 the power source 36 is shown as an internal battery module while in FIG. 2 an alternate embodiment is shown wherein the power source 36 is an external battery module.

Radar device 10 also includes radio module 24 having a port 22 for a wireless communication antenna (e.g., a Low Energy Network (LEN) antenna). Radio module 24 and antenna are used to provide wireless network communication with other wireless systems.

A Radar RF module 32 is also shown having a port 20 for radar antenna 110. Also shown is a Global Positioning System (GPS) module 34, which is used to provide location information regarding the device 10. Device 10 further includes clock distribution circuitry 28 for distributing and synchronizing various clocks across the device 10. An Analog to Digital Converter (ADC) 18 is included and a wakeup timer circuit 31. While wake up timer circuit 31 is shown as a separate circuit, in some embodiments in could be included as part of power control FPGA 25, and is used for controlling various components according to when respective components should be active, such as in power management.

Radar device 10 also includes memory circuitry 30, which is used for storing various state and acquired information (e.g. radar events, audio data, video data, GPS position data (or the like)) for later retrieval and/or transmission. In this example, memory is shown as 30-1 Flash and 30-2 SDRAM. Also shown are Field Programmable Gate Array (FPGA) 16 and Digital Signal Processor (DSP) 14. Device 10 can also include circuitry and interfaces for external inputs and outputs, such as serial connections, Ethernet, USB, Bluetooth, etc.

The memory 30 can include instructions for the processor (such as digital signal processor 14) to execute one or more software applications.

Operational software in the nodes(s) is executed on the DSP 14, which also functions as the microcontroller in the system. Radar processing, initiation of power management, radio, GPS, etc. can all be run by software executed by the DSP 14. Note that an actual configuration for carrying out the application can vary depending on a respective application. For example, radar device 10 can include one or multiple computers or computer processors that carry out the processing as described herein. In alternative embodiments, radar device 10 can be any of various types of networking devices. A communications interface enables the status manager of radar device 10 to communicate over a network and, if necessary, retrieve any data required to indicate status according to embodiments herein. The memory system can be encoded with an application that supports functionality as described above and as described further below. The application (and/or other resources as described herein) can be embodied as software code such as data and/or logic instructions that support processing functionality according to different embodiments described herein.

Figure 2:
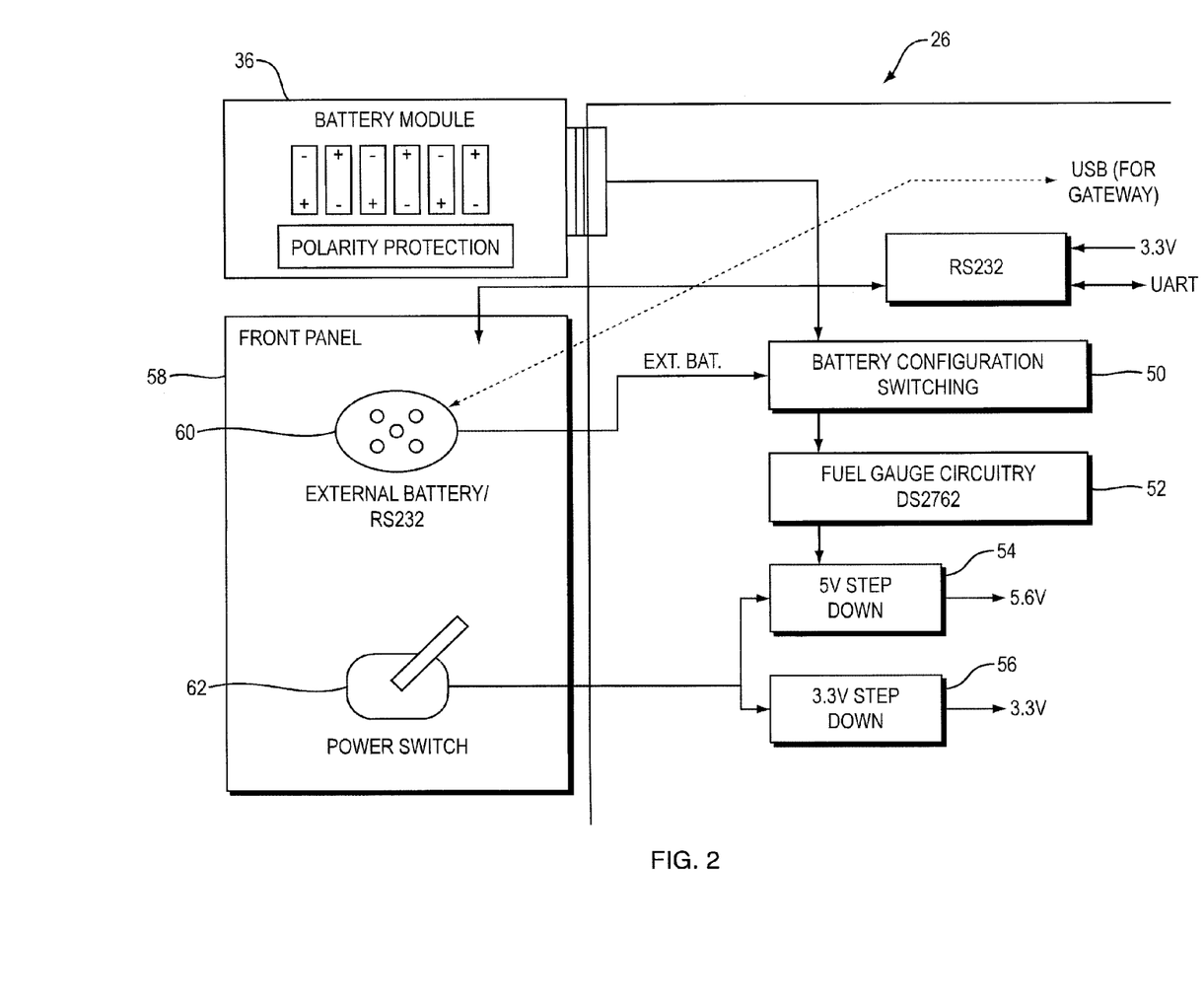
FIG. 2 comprises a block diagram of the power circuitry of the device shown in FIG. 1.

In a particular embodiment shown in FIG. 2, power circuitry 26 includes fuel gauge circuitry 52 for determining how much power is left in the battery module 36. Power circuitry 26 also includes a 5-volt step down device 54 and a 3.3-volt step down device 56. A Front Panel 58 interfaces to power circuitry 26 and includes a power switch for enabling and disabling the 5 volt step down device 54 and a 3.3 volt step down device 56. Front Panel 58 also has an external battery port/RS232 connector 60. The external battery port 60 and the battery module 36 are in electrical communication with the battery configuration switching circuitry 50.

Dependent on battery life and installation, the present invention can support the use of several different types and configurations of batteries. Supported are external batteries for the device, for example a 12-16 volt Lithium Ion battery with Electro-Magnetic Interference (EMI) protection which is rechargeable. An External battery could provide much longer operating life than an internal battery, however an internal battery is more portable. The choice to use either an external battery or an internal battery is mission dependent.

For applications where portability, weight, size is paramount, internal batteries are used. Further primary batteries are preferred for their energy density and reliability. For applications requiring the use of internal batteries, where longer battery life is required, a different type of battery is used, such as a non-rechargeable ("primary") Lithium Thionyl Chloride ($Li-SOCl_2$) battery, which has a 3.6-volt cell voltage. The $Li-SOCl_2$ battery has a much greater energy density than Lithium Ion batteries and thus provides longer battery life in certain use scenarios. Also useable are standard batteries available commercially in hardware stores. These are typically lithium, non-rechargeable, 1.6V cells such as Lithium/Disulfide ($Li/FeS_2$) L91 energizer.

It is beneficial to allow the power supply input range to be limited to a smaller range, as this allows a more efficient power supply design.

Figure 3:
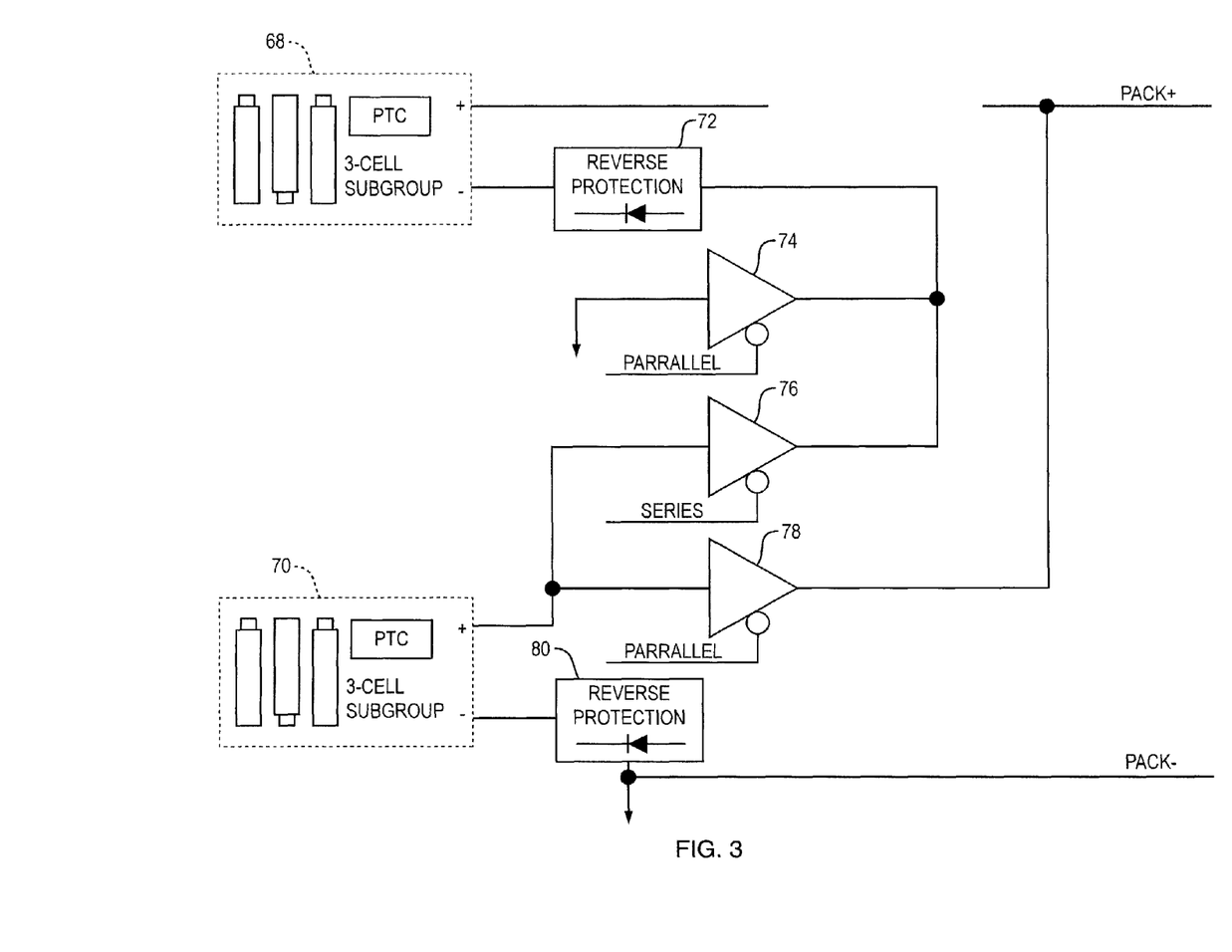
FIG. 3 comprises a block diagram of the battery configuration circuitry in accordance with embodiments of the invention.
Figure 4:
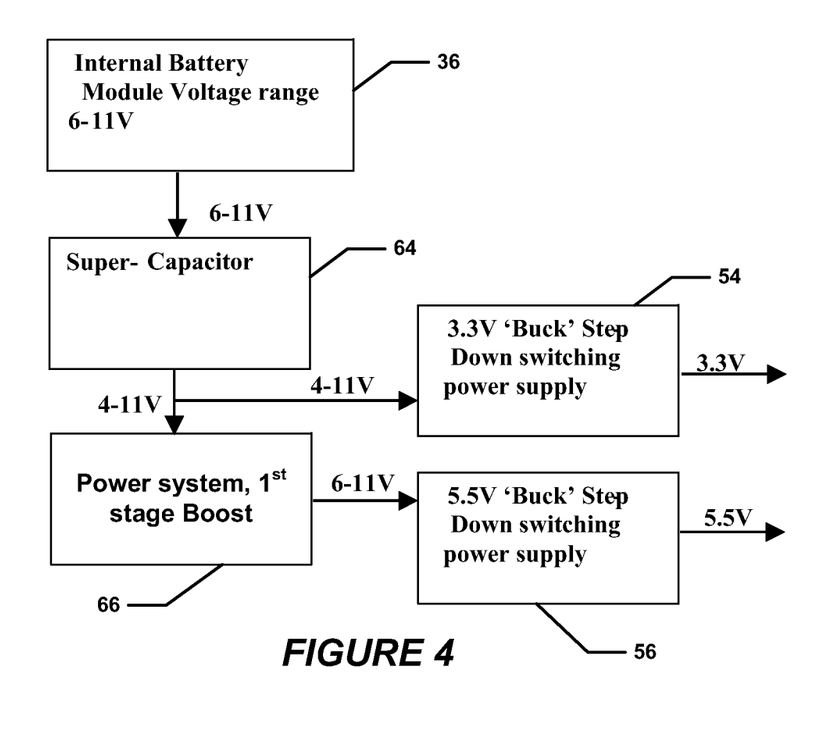
FIG. 4 comprises a high-level block diagram of the battery and power supply system in accordance with embodiments of the invention.

Referring now to FIGS. 3 and 4, to support all of these different cell voltages and battery configurations with one box, and also to deal with polarity reversal, the present battery optimization and protection in a low power energy environment apparatus includes a battery module that slides into the radar unit and that groups the batteries into groups of three (referred to herein as a three pack 68 and 70) shown in FIG. 3. Detection logic onboard is used to detect whether there is reverse polarity, and prevent reverse direction current flow which can be damaging to the batteries and the electronics of the RADAR device itself. In a particular example, what is being done is combining two groups of three series battery cells then using comparators, testing for polarity reversal within the group is performed. If a cell is reversed, the performance of the batteries as a whole may be compromised. Based on the voltage of the group, the type of cell installed is determined and the groups are switched into a series grouping if the cells are low voltage (e.g., Li/FeS$_2$, Alkaline, or Ni rechargeable) or if the voltage level is higher (e.g., Li—SOCl$_2$, etc.) they are switched into a parallel grouping.

The radar unit can execute a series to parallel power switching in real-time, along with the protection circuitry so the user of the device can take multiple different types of batteries for use with the system, where in conventional systems the user would be limited to only one type of battery chemistry. As shown in FIG. 3, a first three pack of batteries 68 has its negative lead connected to a first lead of reverse protection circuit 72. The second lead of reverse protection circuit 72 is connected to current switch path circuit 74 and also to current switch path circuit 76. The other lead of current switch path circuit 74 is connected to ground, while the other lead of current switch path circuit 76 is connected to the positive lead of battery pack 70. Current switch path circuit 76 has one lead connected to the positive lead of battery pack 68 and the other lead connected to the positive lead of battery pack 70. The negative lead of battery pack 70 is connected to reverse protection circuit 80, whole the other lead of reverse protection circuit 80 is connected to the negative power lead.

In use, when it is determined that the battery packs 68 and 70 should be configured in a series arrangement, the current switching path circuits 74 and 78 are disabled, while current switch path circuit 76 is enabled, thereby providing of the negative lead of battery pack 68, through reverse circuit protection circuit 72 to the positive lead of battery pack 70 which results in battery packs 68 and 70 being in a series configuration. On the other hand, when the determination is that the battery packs should be configured in a parallel configuration, the current switching path circuits 74 and 78 are enabled, while current switch path circuit 76 is disabled, thereby providing of the negative lead of battery pack 68, through reverse circuit protection circuit 72 and through current switching path circuit 74 to ground. The positive lead of battery pack 68 is connected through current switching path circuit 78 to the positive lead of battery pack 70 which results in battery packs 68 and 70 being in a parallel configuration.

Typically a unit is tied to one particular chemistry, which might be more convenient for certain applications to simply use the L91 batteries because they are more available, or is Li—SOCl$_2$ batteries are not as readily available. Thus, this battery option 36, along with a super capacitor 64 to overcome the issues with the Li—SOCl$_2$ battery and the pulse demand. In one embodiment the super capacitor 64 has a value of approximately 90 microfarads. However, the super capacitor 64 stores a much smaller amount of energy than does a battery. Since the rates of charge and discharge are determined solely by its physical properties, the super capacitor 64 can release energy much faster (with more power) than a battery that relies on chemical reactions. In a particular example, the Li—SOCl$_2$ batteries provide a steady supply of low current power, suitable for most applications. In some situations, the power required may spike to a higher value for a short period of time, for example for a radio event. When this happens, since the super capacitor 64 is in parallel with the Li—SOCl2 batteries, the super capacitor 64 is used to supplement the power from the Li—SOCl$_2$ batteries for the radio event.

The power supply being used in a particular embodiment comprises a boost-buck combination power supply. This allows the input voltage (battery voltage across the super capacitor) to go below regulated output voltages, thereby increasing the use of energy stored in the super capacitor and allowing longer high energy pulses required by the radios. The first stage 66 of the power system is a 'boost' which is programmed to output 6-11 Volts required to feed the 5.5V second stage buck 56. The boost supply design is such that when the battery voltage is above its programmed output, it efficiently passes the battery voltage to the second stage bucks 54 and 56. However in periods of high power draw, or if the battery voltage is low, the battery voltage may go below the boost stage programmed output in which case, the battery voltage will be boosted to the boost stage programmed output. The second stage of the power system regulates down to a 5.5 Volt and 3.3 Volt values. The purpose is to avoid leaving energy in the batteries 36, that is, to bleed the batteries 36 down until they are completely exhausted. Thus the present battery optimization and protection in a low power energy environment invention provides a combination of being able to sense or identify what batteries (battery chemistry) are being installed and dynamically reconfigure the pack accordingly, and be able to bleed those batteries all the way down to a dead state.

It should be noted that while the above example was described with respect to a radar unit, the same concepts apply equally to other devices such as sensor modules, and in particular to sensor modules in an ad hoc network.

Figure 5A:
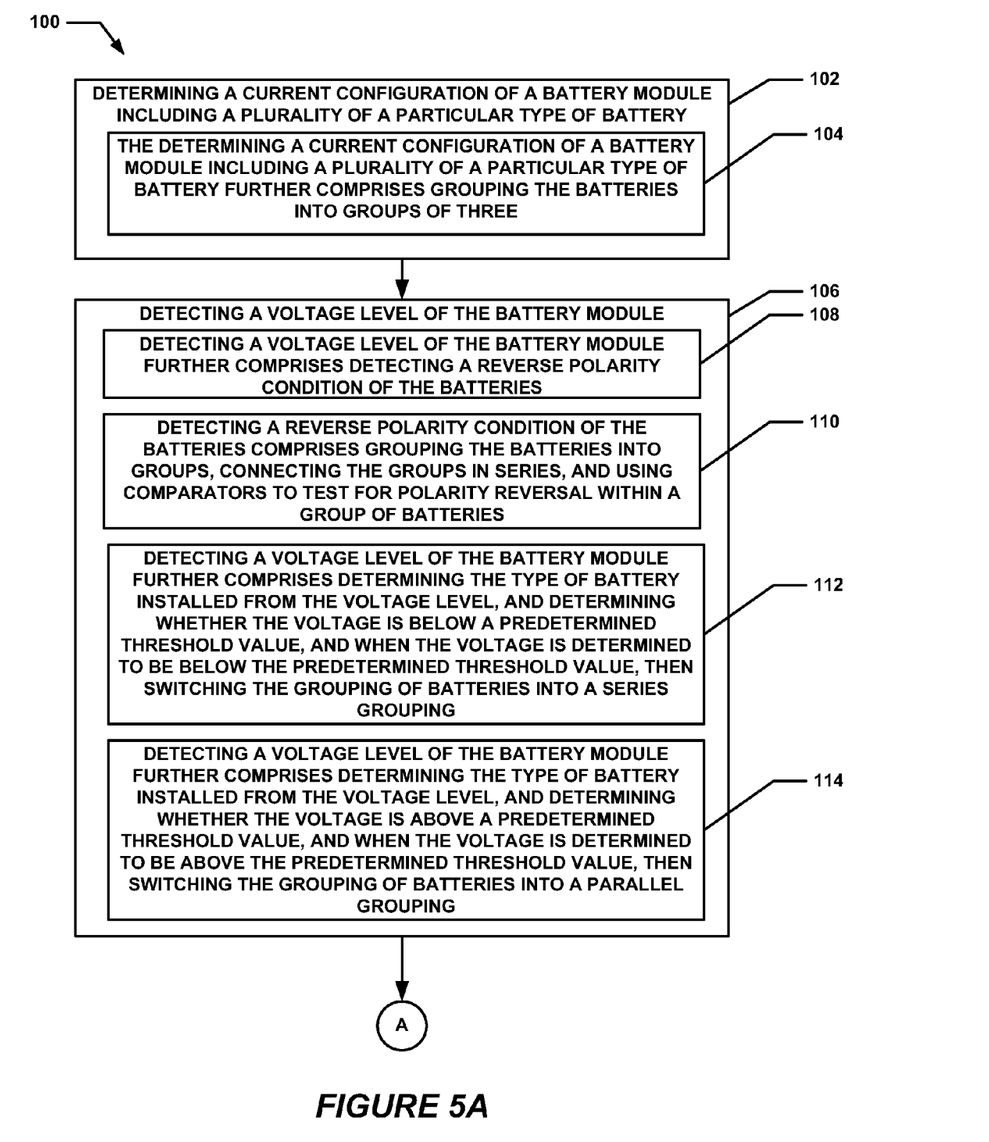
FIGS. 5A and 5B comprise a flow diagram of a particular embodiment of a method for providing battery optimization and protection in a low power energy environment in accordance with embodiments of the invention.
Figure 5B:
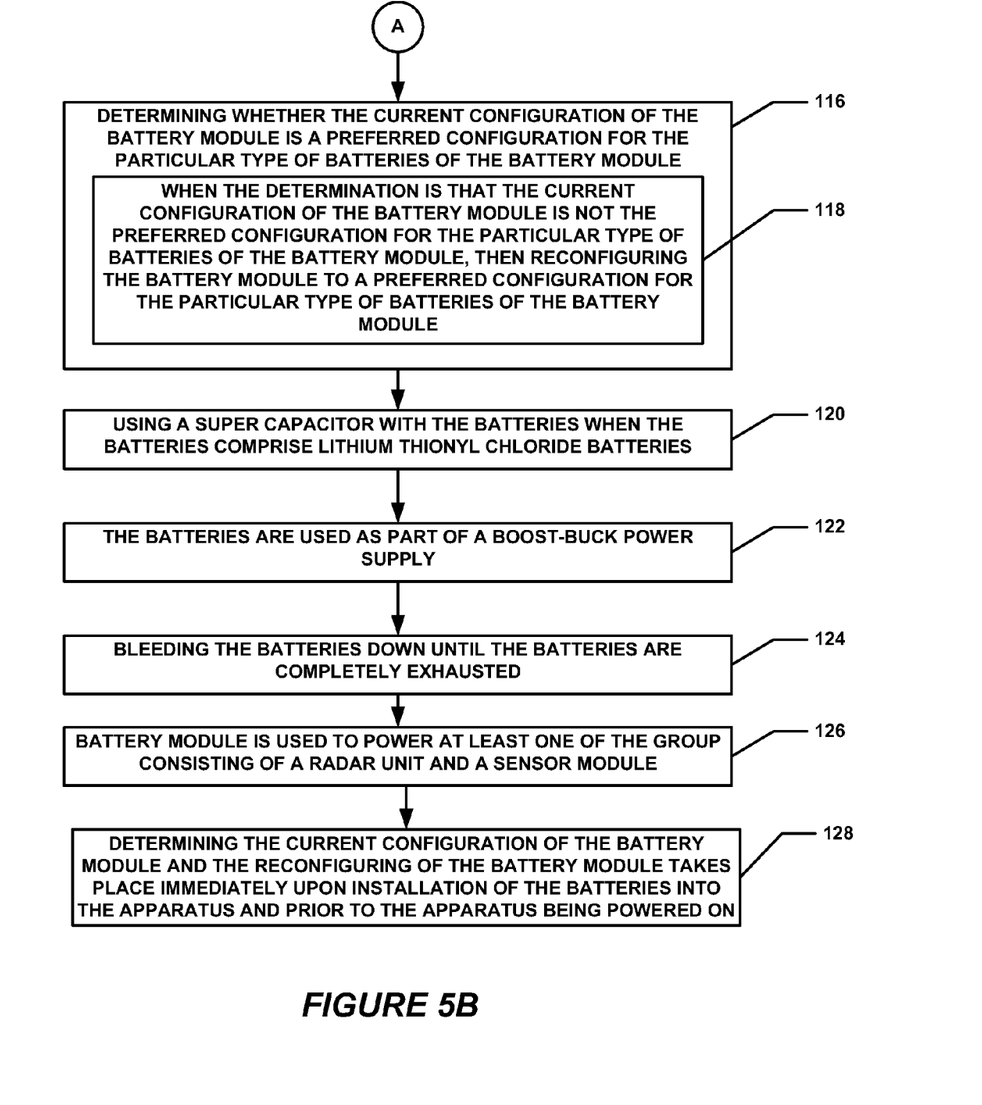

A flow chart of the presently disclosed method is depicted in FIGS. 5A and 5B. The rectangular elements are herein denoted "processing blocks".

Referring now to FIGS. 5A and 5B, a particular embodiment of a method 100 for providing battery optimization and protection in a low power energy environment is shown. Method 100 begins with processing block 102 which discloses determining a current configuration of a battery module including a plurality of a particular type of battery. As shown in processing block 104, determining a current configuration of a battery module including a plurality of a particular type of battery further comprises grouping said batteries into groups of three.

Processing block 106 states detecting a voltage level of the battery module subgroups. Processing block 108 recites detecting a voltage level of the battery module subgroups further comprises detecting a reverse polarity condition of the batteries. Processing block 110 discloses the detecting a reverse polarity condition of the batteries comprises grouping the batteries into groups, connecting the groups in series, and using comparators to test for polarity reversal within a group of batteries. A battery may be reverse polarity within the module, this will result in compromised performance of the battery module.

Processing block 112 states the detecting a voltage level of the battery module further comprises determining the type of battery installed from the voltage level, and determining whether the voltage is below a predetermined threshold value, and when the voltage is determined to be below the predetermined threshold value, then switching the grouping of batteries into a series grouping. Processing block 114 recites the detecting a voltage level of the battery module further comprises determining the type of battery installed from the voltage level, and determining whether the voltage is above a predetermined threshold value, and when the voltage is determined to be above the predetermined threshold value, then switching the grouping of batteries into a parallel grouping.

Processing continues with processing bock 116 which discloses determining whether the current configuration of the battery module is a preferred configuration for the particular type of batteries of the battery module. Processing block 118 states when the determination is that the current configuration of the battery module is not the preferred configuration for the particular type of batteries of the battery module, then reconfiguring the battery module to a preferred configuration for the particular type of batteries of the battery module. It should be noted that the above steps are performed upon installation of the batteries into the system, and prior to the system being powered on.

Processing block 120 recites using a super capacitor with the batteries when the batteries comprise Lithium Thionyl Chloride batteries. The super capacitor stores a much smaller amount of energy than does a battery. Since the rates of charge and discharge are determined solely by its physical properties, the super capacitor can release energy much faster (with more power) than a battery that relies on chemical reactions. In a particular example, the Li—SOCl$_2$ batteries provide a steady supply of low current power, suitable for most applications. In some situations, the power required may spike to a higher value for a short period of time, for example for a radio event. When this happens, since the super capacitor is in parallel with the Li—SOCl2 batteries, the super capacitor is used to supplement the power from the Li—SOCl$_2$ batteries for the radio event Processing block 122 discloses the batteries are used as part of a boost-buck power supply. This allows the input voltage (battery voltage across the super capacitor) to go below regulated output voltages, thereby increasing the sue of energy stored in the super capacitor and allowing longer high energy pulses required by the radios. The supply regulates down to a five or six volt threshold, and will automatically transition from boost to buck.

Processing block 124 states bleeding the batteries down until the batteries are completely exhausted. Thus the present battery optimization and protection in a low power energy environment invention provides a combination of being able to sense or identify what batteries (battery chemistry) are being installed and dynamically reconfigure the pack accordingly, and be able to bleed those batteries all the way down to a dead state.

Processing block 126 discloses wherein the battery module is used to power at least one of the group consisting of a radar unit and a sensor module. Processing block 128 states determining the current configuration of the battery module and the reconfiguring of the battery module takes place immediately upon installation of the batteries into the apparatus and prior to the apparatus being powered on.

While not shown in this example, those skilled in the art will understand that the computer system may include other processes and/or software and hardware components which have been left out of this illustration for ease of description of the invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. An apparatus comprising:
   power circuitry including a detection module, configuration circuitry, and a power supply, said power circuitry being operative to power up said apparatus to a powered on state, and, while said apparatus is in said powered on state, to provide power to components of said apparatus; and
   a battery module including a plurality of batteries of a particular type, said battery module being configured to be installed in said apparatus, and, while said battery module is installed in said apparatus, to be in electrical communication with said power circuitry,
   wherein, upon installation of said battery module in said apparatus, and prior to said apparatus being in said powered on state:
      said detection module is operative to detect a voltage level of said battery module; and
      said configuration circuitry is operative, based at least on the voltage level of said battery module, to configure said plurality of batteries in said battery module to a preferred configuration for powering said apparatus.

2. The apparatus of claim 1 wherein said detection module is used to detect a reverse polarity condition of at least one of said batteries of said battery module.

3. The apparatus of claim 2 wherein, upon installation of said battery module in said apparatus, and prior to said apparatus being in said powered on state, said detection module and said configuration circuitry are further operative to group said batteries into groups, to connect said groups in series or parallel, and to use comparators to test for polarity reversal within the groups of batteries.

4. The apparatus of claim 1 wherein, upon installation of said battery module in said apparatus, and prior to said apparatus being in said powered on state, said detection module is further operative to determine the type of battery installed from said voltage level, and to determine whether the voltage level is below a predetermined threshold value, and, when the voltage level is determined to be below said predetermined threshold value, said configuration circuitry is further operative to switch a grouping of said batteries into a series grouping.

5. The apparatus of claim 1 wherein, upon installation of said battery module in said apparatus, and prior to said apparatus being in said powered on state, said detection module is further operative to determine the type of battery installed from said voltage level, and to determine whether the voltage level is not below a predetermined threshold value, and, when the voltage level is determined not to be below said predetermined threshold value, said configuration circuitry is further operative to switch a grouping of said batteries into a parallel grouping.

6. The apparatus of claim 1 wherein, upon installation of said battery module in said apparatus, and prior to said apparatus being in said powered on state, said detection module is further operative to determine a current configuration of the battery module, and, when the current configuration of said battery module is not the preferred configuration for powering said apparatus, said configuration circuitry is further operative to perform a reconfiguration of the battery module to the preferred configuration.

7. The apparatus of claim 1 further comprising a super capacitor disposed in parallel with said batteries of said battery module.

8. The apparatus of claim 1 wherein said power circuitry further comprising a boost-buck power supply in electrical communication with said battery module.

9. The apparatus of claim 1 wherein said power circuitry is operational to bleed said batteries down until said batteries are completely exhausted.

10. The apparatus of claim 1 wherein said apparatus comprises at least one of the group consisting of a radar unit and a sensor module.

11. A method of an apparatus including power circuitry and a battery module, said power circuitry being operative to power up said apparatus to a powered on state, said battery module including a plurality of batteries of a particular type, and said battery module being configured to be installed in said apparatus, said method comprising:
  upon installation of said battery module in said apparatus, and prior to said apparatus being in said powered on state:
    detecting, by a detection module included in said power circuitry, a voltage level of said battery module; and
    configuring, by configuration circuitry included in said power circuitry, said plurality of batteries in said battery module to a preferred configuration for powering said apparatus based at least on the voltage level of said battery module.

12. The method of claim 11 further comprising, upon installation of said battery module in said apparatus, and prior to said apparatus being in said powered on state, determining, by said detection module, a current configuration of said battery module, and, when the current configuration of said battery module is not the preferred configuration for powering said apparatus, reconfiguring, by the configuration circuitry, said battery module to the preferred configuration, including grouping said plurality of batteries into groups of three.

13. The method of claim 11 wherein said detecting a voltage level of said battery module further comprises detecting a reverse polarity condition of said batteries.

14. The method of claim 13 wherein said detecting a reverse polarity condition of said batteries comprises grouping said batteries into groups, connecting said groups in series or parallel, and using comparators to test for polarity reversal within a group of batteries.

15. The method of claim 11 wherein said detecting a voltage level of said battery module further comprises determining the type of battery installed from said voltage level, and determining whether the voltage level is below a predetermined threshold value, and when the voltage level is determined to be below said predetermined threshold value, then switching said grouping of batteries into a series grouping.

16. The method of claim 11 wherein said detecting a voltage level of said battery module further comprises determining the type of battery installed from said voltage level, and determining whether the voltage level is above a predetermined threshold value, and when the voltage level is determined to be above said predetermined threshold value, then switching said grouping of batteries into a parallel grouping.

17. The method of claim 11 further comprising using a super capacitor with said batteries when said batteries comprise Lithium Thionyl Chloride batteries.

18. The method of claim 11 wherein said batteries are used as part of a boost-buck power supply.

19. The method of claim 18 further comprising bleeding the batteries down until said batteries are completely exhausted.

20. The method of claim 11 further comprising, upon installation of said battery module in said apparatus, and prior to said apparatus being in said powered on state, determining, by said detection module, a current configuration of the battery module, and, when the current configuration of said battery module is not the preferred configuration for powering said apparatus, reconfiguring, by said configuration circuitry, the battery module to the preferred configuration.

\* \* \* \* \*